United States Patent
Schmitt

(10) Patent No.: US 8,548,332 B2
(45) Date of Patent: Oct. 1, 2013

(54) INDIRECT OPTICAL FREE-SPACE COMMUNICATIONS SYSTEM AND METHOD FOR THE BROADBAND TRANSMISSION OF HIGH-SPEED DATA

(75) Inventor: Nikolaus-Peter Schmitt, Brunnthal-Otterloh (DE)

(73) Assignee: Airbus Operations GmbH, Hamburg (DE)

(*) Notice: Subject to any disclaimer, the term of this patent is extended or adjusted under 35 U.S.C. 154(b) by 1000 days.

(21) Appl. No.: 11/663,499

(22) PCT Filed: Jun. 28, 2005

(86) PCT No.: PCT/DE2005/001141
§ 371 (c)(1),
(2), (4) Date: May 12, 2008

(87) PCT Pub. No.: WO2006/032221
PCT Pub. Date: Mar. 30, 2006

(65) Prior Publication Data
US 2008/0219671 A1 Sep. 11, 2008

(30) Foreign Application Priority Data
Sep. 23, 2004 (DE) .......................... 10 2004 046 503

(51) Int. Cl.
*H04B 10/00* (2006.01)
*H04J 14/02* (2006.01)

(52) U.S. Cl.
USPC .............. 398/128; 398/118; 398/130; 398/96

(58) Field of Classification Search
USPC .................. 398/127, 128, 130, 43, 48, 96
See application file for complete search history.

(56) References Cited

U.S. PATENT DOCUMENTS

| 4,358,858 | A | * | 11/1982 | Tamura et al. | ................ | 398/122 |
| 4,977,618 | A | * | 12/1990 | Allen | ............................ | 398/127 |

(Continued)

FOREIGN PATENT DOCUMENTS

| DE | 197 43 229 C2 | 4/1999 |
| DE | 197 55 646 A1 | 6/1999 |

(Continued)

OTHER PUBLICATIONS

Gfeller, et. al., "*Wireless In-House Data Communication via Diffuse Infrared Radiation*", Proceedings of the IEEE, vol. 67, No. 11, Nov. 1979, pp. 1474-1486.

(Continued)

*Primary Examiner* — Nathan Curs
*Assistant Examiner* — Tanya Ngo
(74) *Attorney, Agent, or Firm* — Crowell & Moring LLP

(57) ABSTRACT

An indirect optical free-space communications system provides broadband transmission of high-speed data in transportation vehicles such as aircraft. The system includes a transmitter with a light source that can be modulated and a receiver with a photo detector, adapted to receive light that is emitted from the transmitter and to convert it into an electric signal. The transmitter and the receiver are directed onto at least one common surface, which reflects the light emitted from the transmitter before it reaches the receiver. The free space communications system is cellular and includes several cells, each of which has a transmitter and at least one corresponding receiver. The cells are configured in such a way that crosstalk with a respective adjoining cell is prevented. The cells are thus independent of one another.

15 Claims, 8 Drawing Sheets

(56) References Cited

U.S. PATENT DOCUMENTS

| | | | |
|---|---|---|---|
| 5,305,133 A * | 4/1994 | Cooper et al. | 398/42 |
| 5,822,678 A * | 10/1998 | Evanyk | 725/106 |
| 5,896,215 A | 4/1999 | Cecil et al. | |
| 5,986,787 A * | 11/1999 | Ohshima et al. | 398/127 |
| 6,381,055 B1 * | 4/2002 | Javitt et al. | 398/131 |
| 7,751,716 B2 * | 7/2010 | Killinger | 398/129 |
| 8,320,767 B2 * | 11/2012 | Morris et al. | 398/130 |
| 2001/0009021 A1 * | 7/2001 | Ellington et al. | 710/129 |
| 2002/0126967 A1 * | 9/2002 | Panak et al. | 385/101 |
| 2002/0153478 A1 * | 10/2002 | Hsin | 250/227.14 |
| 2002/0171898 A1 | 11/2002 | Patton | |
| 2003/0226091 A1 * | 12/2003 | Platenberg et al. | 714/776 |
| 2004/0141744 A1 | 7/2004 | Krill et al. | |
| 2004/0208597 A1 * | 10/2004 | Wittenberger et al. | 398/130 |

FOREIGN PATENT DOCUMENTS

| | | |
|---|---|---|
| DE | 101 07 538 B4 | 10/2002 |
| EP | 0 629 881 A2 | 12/1994 |
| EP | 0 905 993 B1 | 3/1999 |
| EP | 1 079 550 A1 | 2/2001 |
| WO | WO 96/11539 A2 | 4/1996 |
| WO | WO 02/067465 A2 | 8/2002 |

OTHER PUBLICATIONS

Valadas, et. al., "*Throughput Performance of non-Persistent CSMA/CD Quasi-Diffuse Infrared Local Area Networks under an Imperfect Average Power Sensing Collision Detection Method*", IEEE, Feb. 1993, pp. 567-572.

International Search Report dated Dec. 5, 2005 with English translation of relevant portion and PCT/ISA/237 with English translation of supplementary sheets (Fifteen (15) pages).

Forms PCT/IB/373, PCT/IB/326, PCT/IB/338 and PCT/ISA/237 w/English translation (fifteen (15) pages).

* cited by examiner

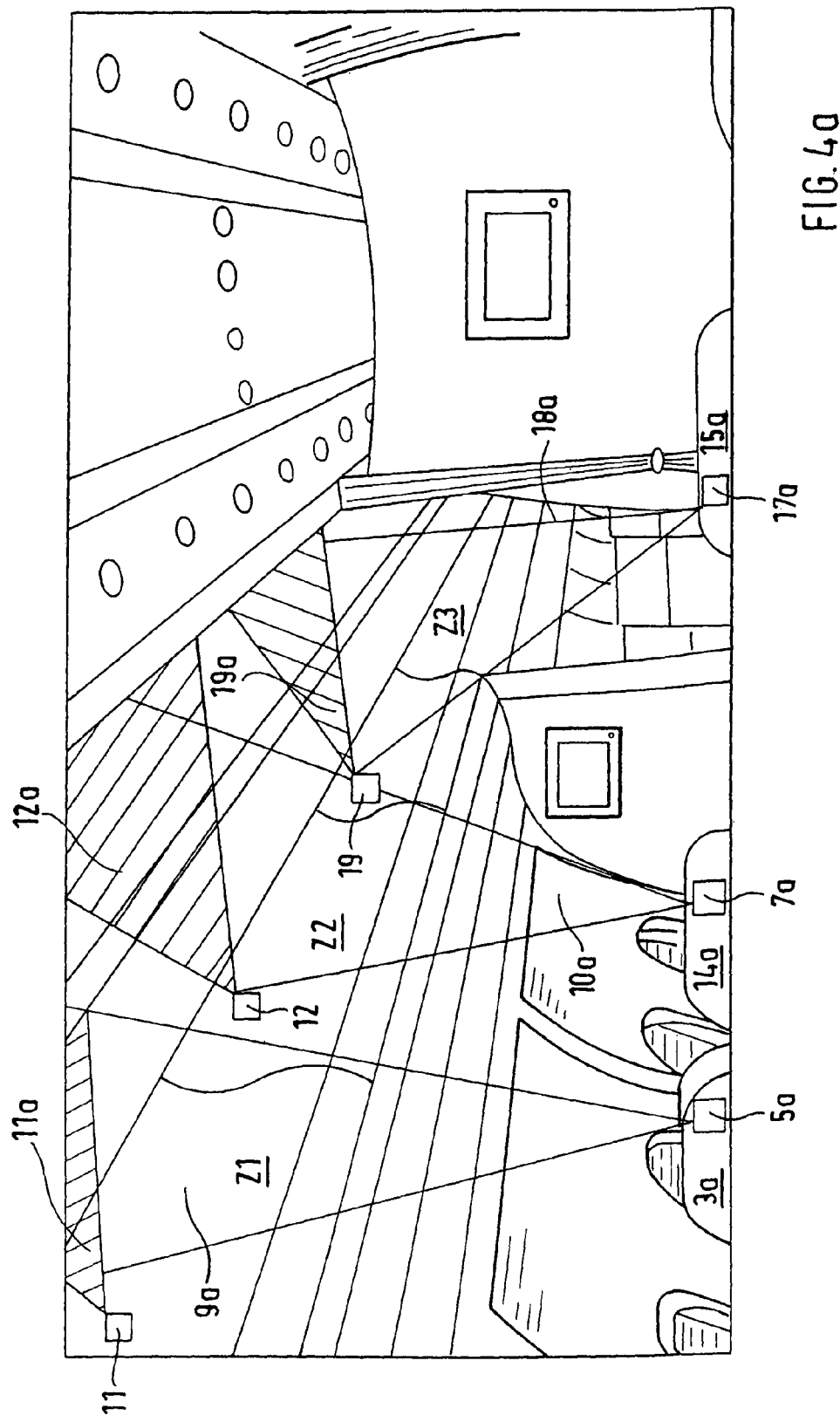

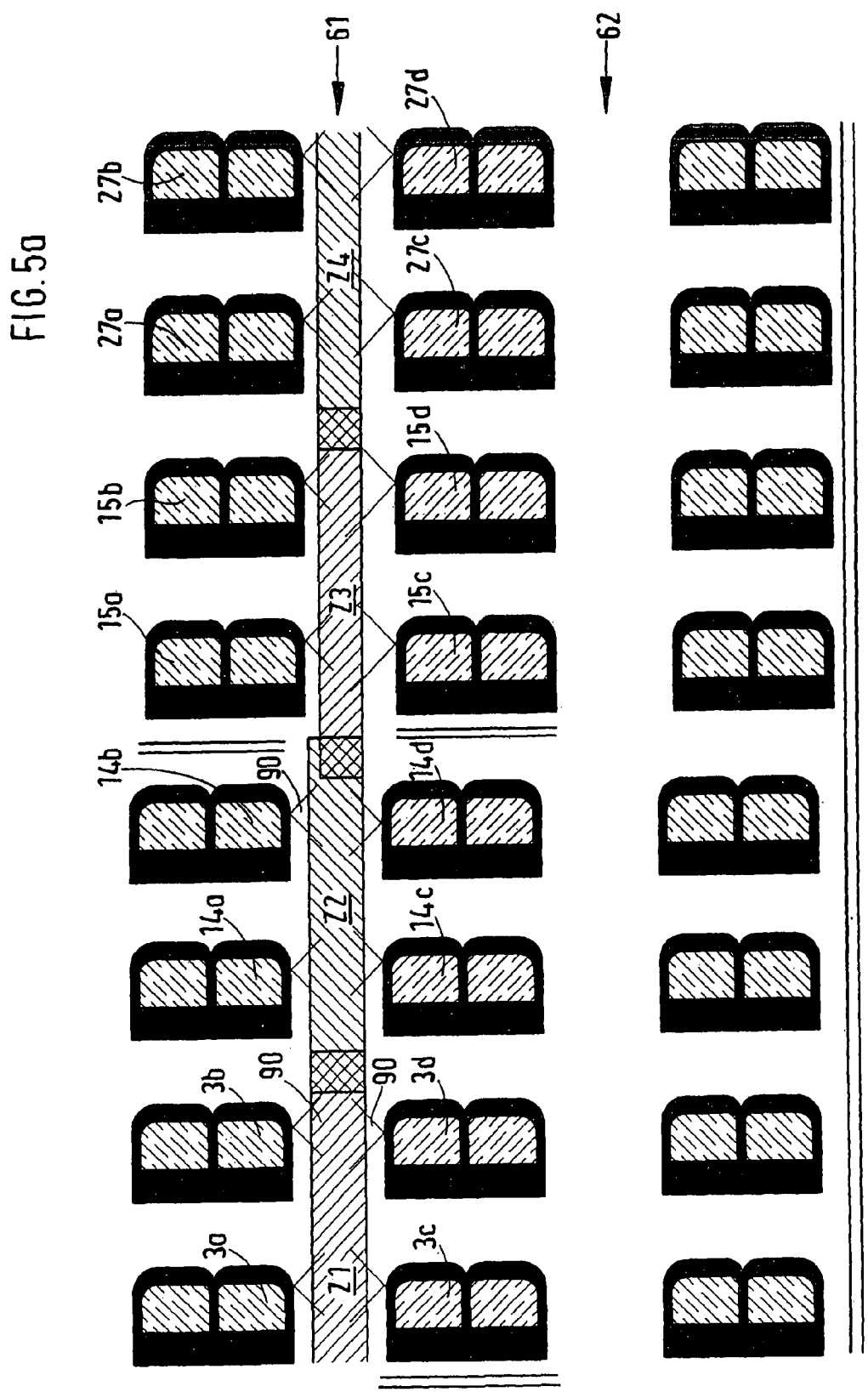

INDIRECT OPTICAL FREE-SPACE COMMUNICATIONS SYSTEM AND METHOD FOR THE BROADBAND TRANSMISSION OF HIGH-SPEED DATA

BACKGROUND AND SUMMARY OF THE INVENTION

This invention relates to an indirect optical free-space communications system for broadband transmission of high-speed data and a method for broadband transmission of high-speed data.

Communication between computers or other technical systems is important not only in office rooms or computer rooms but increasingly also in the interior of transportation means because data communication is also increasingly important there. For example, larger transportation means, such as buses, trains, airplanes, ships, etc. are equipped with displays, earphone connections, input terminals and/or receivers or data stations, so the passenger can be entertained or informed during the trip and service personnel can exchange data with central data stations, etc. In such applications, very large volumes of data are usually transmitted by a central data memory and/or transmitter to one or more data receivers or vice-versa.

The data transmission, which may be in analog or digital form, is accomplished via electric cable connections between the transmitter and receiver. However, this is associated with a number of disadvantages.

First, cable must be installed to each terminal, i.e., each receiver/transmitter and/or each data station in the interior must be equipped with a suitable plug and the cable must be provided with a suitable plug connection at the location of the connection. The receiver/transmitter therefore has only limited flexible mobility and also needs a standardized plug connection, and the number of possible receivers is predetermined by the number of plugs on the cable or by the number of cables. The location of the data station is also limited by the predetermined spatial arrangement. This is problematical where the number and location of receivers is not predetermined and must be kept flexible. However, equipment with a great many cables and plug connections is expensive and susceptible to trouble.

Electric cables are also exposed to interference due to electromagnetic radiation (EMF). There is a drastic loss of quality during transmission of analog signals in particular but interference also occurs in the case of digital transmission. This problem is especially difficult to handle in transportation means because in a moving vehicle, unlike a fixed building, the environment and the incident radiation cannot be kept constant over the transmission link, so that incident radiation can at most be reduced by overdimensional shielding during travel. However, such highly shielding cables are heavy, expensive and immobile. Furthermore, the transportation means itself may cause a high level of electromagnetic contamination, i.e., EMF.

In addition, an electric cable is not only exposed to incident radiation but also emits radiation itself. This in turn causes EMF with respect to other electronic systems within the transportation means or with respect to other transportation means that happen to be in the vicinity. Furthermore, such a system is also susceptible to interception.

Another disadvantage is the limited data rate which can be transmitted due to the limited bandwidth of electric cables. The higher the data rate, the more difficult is its transmission over an electric connection owing to damping and dispersion and the greater is the problem of EMF and shielding.

To overcome the problem of EMF, an attempt is made to perform the data transmission through optical fibers by means of modulated light signals. A light source is usually amplitude modulated. Frequency and phase modulation are also possible. The light of the transmission source is transmitted to the receiver over a glass or plastic light source conductor that replace the electric cable. The receiver contains a photodetector for converting the optical signal back into an electric signal. Very high data rates can be achieved in this way and EMF is ruled out.

However, inflexibility with regard to the number and location of the stations to be connected in the interior remains a problem, especially since the optical fibers and plug connections cost more in general than the corresponding electric connections and are more difficult to install. Furthermore, it is difficult to provide free plug connections for stations to be connected later and/or it can be done only at great expense.

To solve the problem of cabling, there have been attempts to use wireless communication systems such as those that have long been used in the field of wireless transmission. By analogy with radio and wireless communications, all types of data can be transmitted by wireless transmission. The possible data transmission rate, however, depends on the frequency of the electromagnetic radiation used. Recently there are small microwave transceivers having frequencies in the gigahertz range, which in practice allow data communication in the range of a few Mb/s. However, a disadvantage here is that the data transmission rate is limited in principle, and there is still the problem of EMF radiation and emission of EMF into other systems of the transportation means as well as the problem of security against interception. In the case of transportation means that are used mainly in various countries of the world, such as airplane or ships, the local regulations for the frequency bands and types of modulation that are used must be taken into account, which greatly restricts the choice of available frequency bands and complicates their international use.

An alternative approach is a wireless but optical data transmission system in which the optical radiation modulated with data is transmitted directly into the room and is received by a photodetector (e.g., IrDA standard). This method is used, for example, for data transmission between a mobile computer and a printer. However, the disadvantage of this method is that there must be a direct line-of-sight connection between the transmitter and receiver, and the distance between the two must be relatively small, typically <1-2 meters. The radiation must be within a certain angle range of the receiver, e.g., in the range of less than ±15° and in direct visual contact with it.

IR data transmission systems using scattered IR radiation which have a much greater range and acceptance angle and are suitable for connecting computers in office rooms, for example, are described by F. R. Gfeller, U. Bapst, Proceedings of the IEEE, Vol. 67, No. 11, November 1979.

Another system is described in German Patent DE 101 07 538 B4. Such a system allows a considerable bandwidth in the range of a few Mb/s to approx. 100 Mb/s and ranges of several meters without the requirements of beam alignment due to the use of scattered radiation, where the bandwidth is limited essentially by the multipath propagation which occurs with multiple reflections.

FIG. 1 shows such a known optical free-space communication system for broadband transmission of high-speed data. It includes a transmitter 1, which has a modulable light source and at least one receiver 5a, 5b, 5c, 5d comprising a photodetector to receive light transmitted by the transmitter 1 and converted into an electric signal. The transmitter 1 and receivers 5a, 5b, 5c, 5d are designed so that the light transmitted by the transmitter 1 is detectable and/or detected by the receiver 5a, 5b, 5c, 5d after scattering or reflection on a surface 7 inside a transportation means. The surface 7 is situated inside, i.e., in the interior space of a transportation means, e.g., on a ceiling 8. The light source used may be, for example, one or more LEDs, laser diodes, edge-emitting laser diodes and/or VCSEL lasers, and there may be bidirectional communication between the transmitter and receiver.

A bidirectional design is preferable because of the greater flexibility. Therefore, when speaking of transmitters below, this is understood to refer, for example, in particular to the transmitter or transceiver which is attached to the body of the transportation means, for example, and the term data station is understood to refer, for example, in particular to the receiver or transceiver that is facing the user, i.e., is mounted on the passenger seat and/or on the multimedia unit attached to the seat, on a handheld device or the like. To be able to differentiate this, the following text therefore refers simply to a distributor and a data station.

The object of the present invention is to improve upon the known optical free-space communication system in such a way that the bandwidth is increased. In particular, high data rates in the range of Gbit/s or more on the whole should be transmissable in the interior of transportation means such as airplane or motor vehicles.

This object is achieved by the optical free-space communication system for broadband transmission of high-speed data as claimed and by the method for broadband transmission of high-speed data as claimed. Other advantageous features, aspects and details of the invention are derived from the dependent claims, the description and the drawings.

The inventive indirect optical free-space communication system is used for broadband transmission of high-speed data and includes a transmitter having a modulable light source and a receiver having a photodetector to receive light emitted by the transmitter and converted into an electric signal. The transmitter and receiver are directed at at least one shared surface that reflects light emitted by the transmitter before reaching the receiver. The free-space communication system has a cellular design and includes several cells, each of which comprises at least one transmitter and at least one receiver, and the cells are designed to prevent crosstalk with any of the neighboring cells, so the cells are independent of one another.

High data rates in the range of Gbit/s or even higher can be transmitted optically with this system from one transmitter to multiple receivers (unidirectional) and/or from one transmitter to multiple distributed receivers (unidirectional broadcast) or between transceivers (bidirectional). This system can be used in the interior of transportation means or vehicles, where it allows secure transmission of high data rates at a reduced cost and with increased bandwidth.

With this communication system it is possible to easily transmit data at a high rate in a transportation means, e.g., an automobile, airplane, train, ship, satellite or the like without requiring a direct line-of-sight connection between the transmitter and receiver and without requiring cabling between the transmitter and receiver for data transmission. This invention also overcomes the problem of the EMF and ensures an increased security against interception.

Through this invention, multiple transmitters with respective receivers, e.g., in an airplane having two or more aisles between the rows of seats can utilize the full bandwidth of approximately 100 Mbit/s, for example, independently of one another; this corresponds to doubling the total useable bandwidth. Two or more "cells" of a communication system based on the same physical medium can thus be implemented, and the system does not have any crosstalk due to the relatively good alignment of the optical signal. This is possible only in the optical range used here because such a sharp delineation would not be possible with radio waves because of the non-directional propagation at lower frequencies.

The surface to which the distributors, i.e., transmitters and data stations, i.e., receivers are directed is advantageously situated in the interior space of a transportation means in which the data transmission takes place, preferably in an automobile, airplane, train, ship or satellite. In this way the data transmission can take place in mobile systems in a particularly simple manner. The cost is reduced and comfort is increased because there are no restrictions or at least there are only minor restrictions with regard to the reception site.

Means for beam shaping of the respective transmitter and/or means for limiting the reception opening angle of the respective receiver are advantageously provided to prevent crosstalk. Therefore the optical beam propagation is shaped in a suitable way so as to yield only spatially limited signal propagation. For example this also takes into account the fact that the data rates are limited to approximately 100 Mbit/s due to multipath propagation.

The indirect optical free-space communication system is preferably designed so that the reflection or scattering ranges of the shared surfaces do not overlap mutually within neighboring cells. Therefore independent communication cells can be achieved, e.g., along an aisle in an airplane or in transportation means in general.

For example, in an airplane with two aisles, the ceiling panels along the two aisles may reflect signals from separate transmitters or transceivers, so that there is no overlapping of the surfaces reflecting signals of the transmitters and receivers of the two aisles where said surfaces are reflecting signals, i.e., within the line of sight vision of the receivers.

For example, areas of an airplane along its aisle may reflect the optical signals separately, so that the neighboring shared surfaces of different distributors and data stations of an area do not have any overlap with those of the other area and can communicate independent of one another so that different, independent communication cells that do not have any crosstalk are formed along an aisle. The surfaces reflecting optical signals can be delineated either through a suitable choice of the transmission and reception lenses or by fade-in using optically nontransmitting beam apertures at the border of the mutually independent surfaces reflecting signals.

Therefore one or more shading elements is also preferably provided, serving to shield the light reflected by the shared surface of one cell with respect to a receiver belonging to a different cell.

The light sources of neighboring cells especially advantageously have different wavelengths. In this way the surfaces reflecting signals and/or the surfaces in the field of vision of the receivers can easily overlap at the interfaces, for example. The different wavelengths of the light are 810 nm and 960 nm; these wavelengths are especially easy to separate by simple filters of the receiver. Therefore, corresponding light sources, preferably LEDs or lasers of the two wavelength ranges, are used at the transmission end.

The different measures are especially preferably combined, which yields special advantages.

Although the two aisles of an airplane, for example, are separated by the beam guidance as independent communication cells because of the shadowing that occurs in the borderline area due to the baggage receptacles in the middle area, slightly overlapping cells with different wavelengths are implemented along the aisles. The full reflection/adjustment of the field of vision is accomplished preferably in such a way that although overlapping may be possible (but need not be possible) in the borderline area of neighboring cells, there is no overlapping with the next-but-one cell. Therefore, only two different labelings L1 and L2 are needed along an aisle, alternating approximately in the arrangement L1-L2-L1-L2-L1-L2. This reduces the equipment complexity due to the wavelengths required to a number limited to two, especially since filtering need not be very sharp, but on the other hand, almost any data speed can be achieved due to the alternating use.

This means that the cells are preferably arranged in a row, with the wavelengths of the light alternating in neighboring cells.

However, the cells are advantageously also separated from one another spatially. The area of a cell is a surface of a wall or an object in the interior of a space in which data is transmitted.

The light source of the respective transmitter includes, for example, one or more LEDs, laser diodes, edge-emitting laser diodes and/or VCSEL lasers.

The respective receiver may include a light source and the respective transmitter may include a photodetector to perform bidirectional communication. During operation a single transmitter of a cell may supply a plurality of receivers with identical or different data at the same time.

According to another aspect of the invention, a method for indirect optical transmission of high-speed data is made available. In the method light is generated by means of a light source, and is modulated at the frequency of the data to be transmitted. The modulated light is transmitted onto a surface that reflects and/or scatters the light and the light scattered and/or reflected by the surface is received so that it travels from the light source to the receiver by an indirect route. The modulated light is connected into an electric signal, whereby the transmission and reception of the light take place in multiple independent cells. Each cell includes at least one transmitter and at least one receiver, and crosstalk with a neighboring cell is actively prevented.

The advantages achieved above with respect to the inventive system are also applicable for the inventive method and vice-versa.

The light emitted by the transmitter of a cell is limited in its beam angles such that it does not reach receivers of other cells.

For example, the reception beam angle of the respective receiver of a cell may also be limited in such a way that the light from the light sources of neighboring cells does not reach the receiver.

In particular, the light reflected from the surface of a cell may also be shaded with respect to a receiver belonging to another cell.

Light of different wavelengths is advantageously used in neighboring cells.

BRIEF DESCRIPTION OF THE DRAWINGS

An example of invention will now be described with reference to the drawing figures, in which:

FIG. 4a shows an inventive arrangement according to FIG. 3 wherein the crosstalk is prevented by suitable beam guidance;

FIG. 5a shows an inventive arrangement in a schematic design in which several independent crosstalk-free cells are operated along the aisle of an airplane by using two different transmission wavelengths;

DETAILED DESCRIPTION OF THE INVENTION

Figure 1:
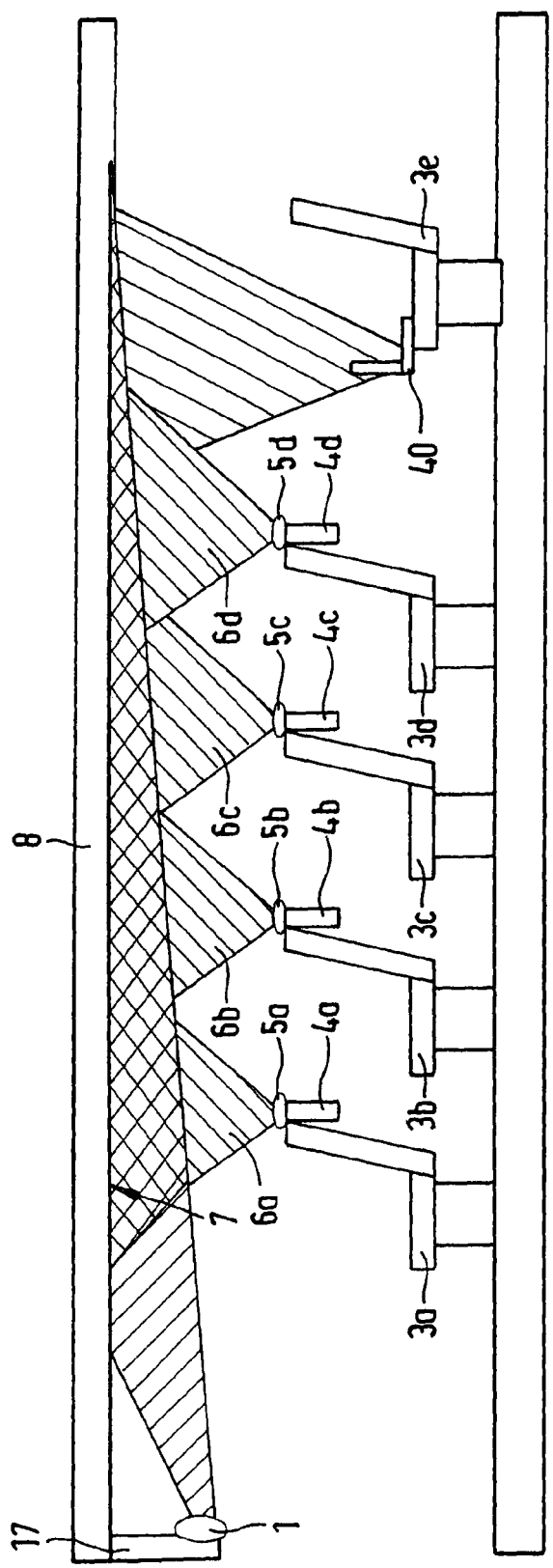
FIG. 1 shows an example according to the state of the art with beam guidance of a data communications link without a line-of-sight connection.

FIG. 1 shows a schematic sectional view of a known optical free space communication system that is improved upon by the present invention and that is described in detail in German Patent DE 101 07 538 B4.

A "distributor" or transmitter 1 which is mounted on the transportation means, e.g., on a holder 17, is arranged in such a way that the light emitted by it strikes a surface 7 at a distance on a ceiling 8 of a transportation means. The transportation means is, for example, an airplane, a motor vehicle, a motor vehicle, a train, bus, streetcar, satellite or the like. Data stations 5a, 5b, 5c, 5d, 40 and the respective multimedia stations 4a, 4b, 4c, 4d are arranged at a distance from the distributor 1 and receive the light reflected and/or scattered by the surface 7. Thus the light goes by an indirect route from the distributor 1 to the data stations; an oblique hatched region illustrates the light emitted by the distributor and a region 6a, 6b, 6c, 6d having oblique hatching in the other direction represents the reception area of the respective data stations. The overlapping area with crosshatching in FIG. 1 denotes the light that is emitted by the distributor 1 and reaches the data stations 5a-5d, 40 in the respective reception areas 6a-6d. Due to the fact that the light is scattered at the surface 7, there must not be any direct line of sight contact between the distributor 1 and the data stations 5a-5d, 40, i.e., there may even be an obstacle between the two. The reference numerals 3a-3e in this diagram indicate passenger seats.

The known free-space communication system according to FIG. 1 is part of a preferred embodiment of the invention which reflects the known system.

The surface 7 may be a part of the interior paneling in the transportation means, for example, e.g., the roof liner of a motor vehicle or the side paneling of the doors, the paneling of the roof pillars or IR reflecting window surfaces, etc. It is also possible to use as the surfaces 7, e.g., in an airplane or a train the ceiling, the floor, the side walls, paneling parts of the interior, etc. In general terms, any surface onto which a light source can be directed and which will then reflect or scatter at least a portion of the incident radiation is suitable.

In waiting rooms or transportation means, many such surfaces are available and can be used as part of the optical free-space communication system in the manner according to the present invention. However, it is also possible to provide a special reflection or scattering element having a structured surface for deflecting the beams of light as part of the system.

In the case of bidirectional transmission, transmission units are also integrated into the data stations 5a, 5b, 5c, 5d, 40. The areas 6a, 6b, 6c, 6d are therefore at the same time also the corresponding beam angles of the transmission units integrated into the data stations. The two beam angles of the receiver and transmitter of a data station need not be identical;

in that case differentiation of the transmission direction is the responsibility of the protocol. However, in this basic diagram according to FIG. 1 they are not differentiated for reasons of simplicity.

A portable computer or handheld device 40 which is designed as a data station and/or has an inventive input unit and/or transmission unit for communication via the surface 7 is installed at the additional seat 3e.

According to a preferred embodiment of the invention, the distributor 1 consists of one or more LEDs, edge-emitting laser diodes, laser diodes or VCSEL laser diodes as the light source. The output power of the light source here is limited at the lower end by the fact that depending on the geometric factors of the transportation means and the reflexivity of the surfaces in the interior, a sufficient quantity of light is able to reach the data stations via reflection. The output power of the light source of the distributor 1 is limited at the upper end by the limit of eye safety, i.e., so that the possibility of eye damage is ruled out during operation. Depending on the specific embodiment of the transportation means, it is possible to work with a low output power accordingly.

However, if the required output powers of traditional LEDs or VCSEL laser diodes is in the near infrared, i.e., usually at a wavelength <1 μm, which is higher than the limit set by law, then LEDs or VCSEL laser diodes which emit at a wavelength having a much higher damage limit with regard to retinal tolerability, e.g., 1.55 μm may be used.

The distributor 1 which is mounted on the transportation means by means of the holder 17 may emit, e.g., along the fuselage of an airplane, so that it directs signals at one or more ceiling panels 8 along an aisle. It may thus be mounted across the fuselage, so that it directs optical signals at a single ceiling panel from head rack to head rack, for example, or may be arranged at any angle in between with oblique signal reflection characteristics accordingly. For example, it may also be accommodated together with the optical signal equipment for the compartment in a shared housing. In the case of LEDs as the cabin optical signal means, this would actually be especially advantageous.

The receiver which is included at least in the data stations 5a-5d and/or in the handheld device 40 but also in the distributor 1 consists of one or more photodetectors, the surface of which is limited by the capacitance and thus the possible data rate. The restriction at the lower end is determined by the sensitivity. For detection of the radiation reaching the detector by reflection in the interior of the transportation means, the detector surface usually amounts to at least a few mm$^2$.

Using LEDs allows wide-area signal radiation of the reflecting surfaces and/or surfaces or inside walls of the transportation means because of the high divergence, although the output power here is limited. If necessary, several LEDs may be used to generate a higher power output.

VSCEL laser diodes that are small in size and can be manufactured especially inexpensively have a much higher output power at a much higher efficiency. In other words, low currents occur, typically <10-20 mA at less than 5 V. The emission characteristic of this VCSEL, however, differs significantly from the bundled characteristic, where divergence is typically in the range of a few degrees. VCSEL laser diodes may also be controlled directly by electronic driver modules and/or standard TTL drivers on the basis of the low voltages and extremely low currents. This optionally takes place with the use of a voltage divider. Therefore, the power supply is very simple and an extremely high data rate is made possible, e.g., greater than 1 Gb/s, in addition to the low capacity of the VCSEL elements.

Figure 2:
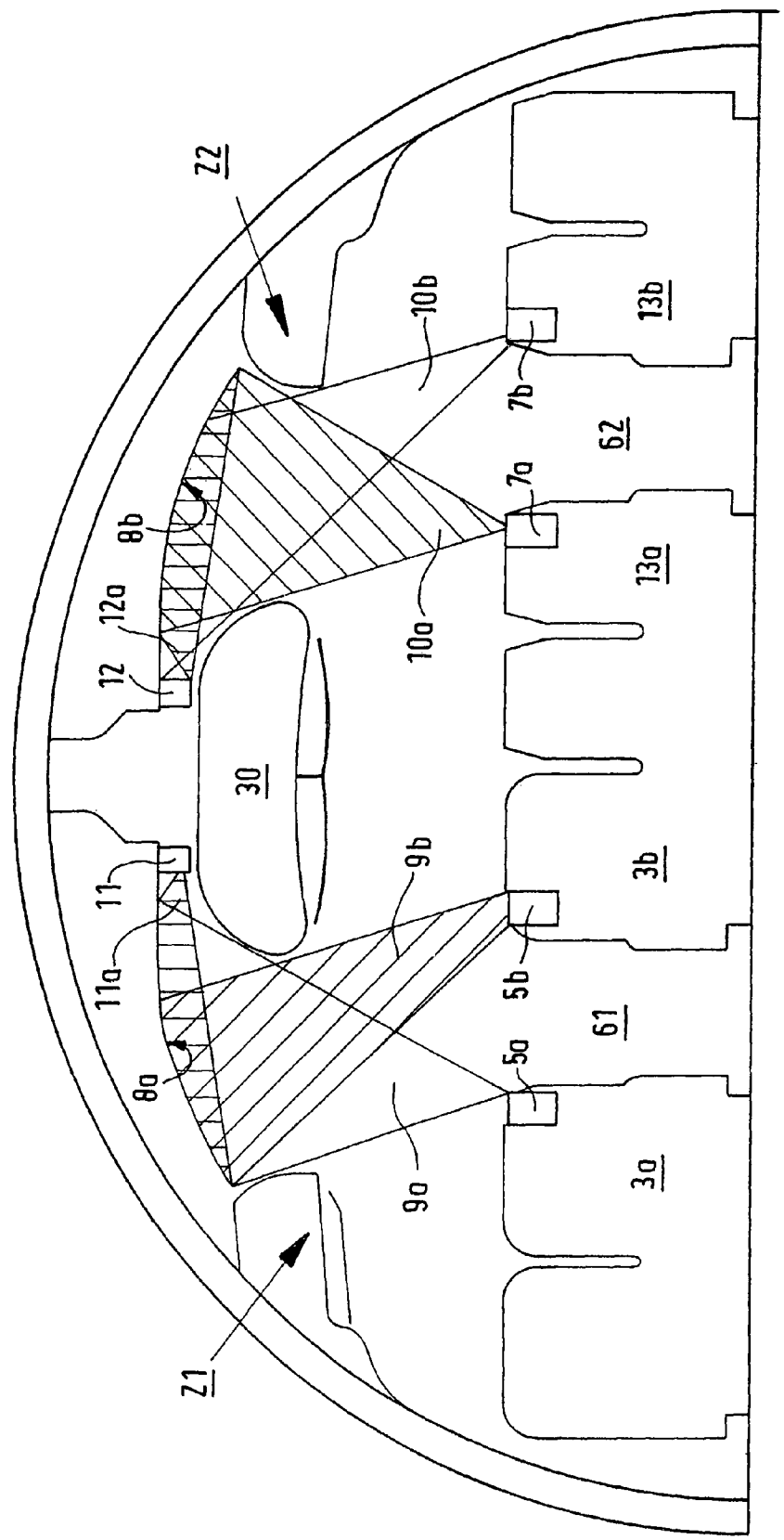
FIG. 2 shows an inventive arrangement in a schematic diagram according to an embodiment in which an airplane with two aisles are operated as separate communication cells.

FIG. 2 shows an inventive arrangement with spatially separate regions of two aisles 61 and 62 that form the cells Z1, Z2. The respective elements of the two cells Z1, Z2 are labeled as follows: 5a, 5b represent the data stations of the aisle 61, whereas the data stations of the aisle 62 are labeled as 7a and 7b. A distributor 11 is assigned as a transmitter or transceiver to the aisle 61. Another distributor 12 as a transmitter or transceiver is assigned to the aisle 62. The distributor 11 and/or the transmitter for the aisle 61 and the respective receiver and/or data stations 5a, 5b are aimed at the shared surface 8a. The distributor 12 for the aisle 62 and the respective receivers and/or data stations 7a, 7b are directed at the shared surface 8b.

The data stations 5a, 5b and 7a, 7b each have a field of view and/or reception angle 9a, 9b and/or 10a, 10b, which corresponds here at the same time to the respective emission characteristics of transmitters optionally contained in the data stations 5a, 5b, 7a, 7b.

The distributors 11 and 12 each have an emission characteristic 11a and 12a, respectively, which corresponds here at the same time to the field of view of receivers optionally contained in the distributors 11, 12.

The data stations 5a, 5b and 7a, 7b are each mounted at a seat 3a, 3b and 13a, 13b respectively, whereby the group of seats 3a, 3b belongs to the aisle 61 and the group of seats 13a, 13b belongs to the aisle 62.

The two communication cells are independent of one another and cannot have crosstalk because there is shielding of the shared surface 8a for the components of the aisle 61 due to the central baggage compartment 30 and conversely there is shadowing of the surface 8b for the components of the aisle 62.

This results in two cells of a communications network which are assigned to the two aisles 61 and 62 and can be operated independently and without mutual crosstalk.

As a result of this measure, the total data rate transmitted can be doubled in comparison with a simple system.

Figure 3:
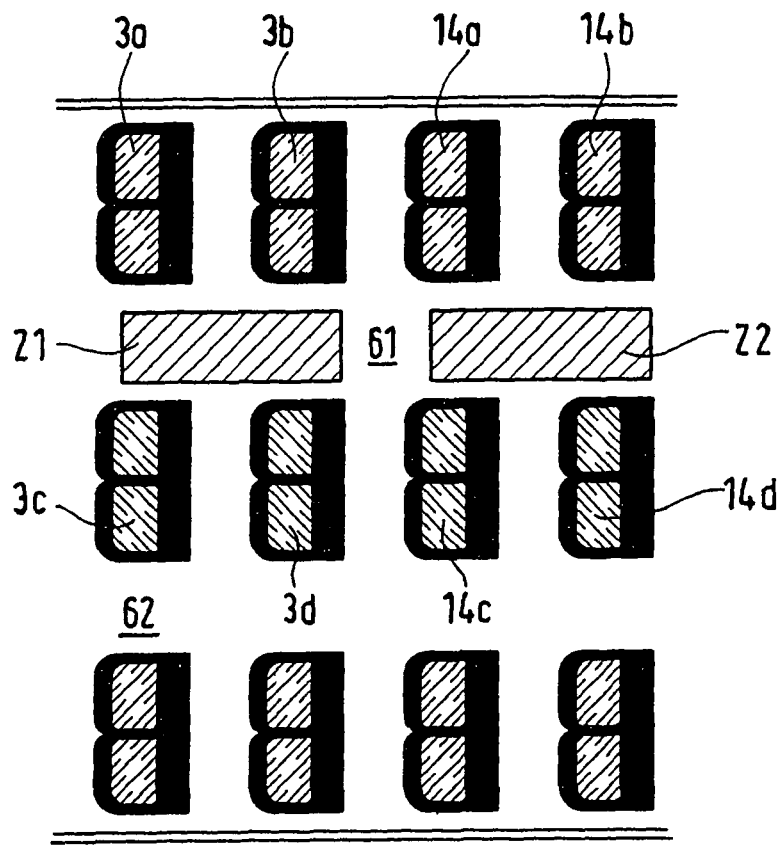
FIG. 3 shows an inventive arrangement in a schematic diagram in which independent crosstalk-free cells are operated along an aisle of an airplane.

FIG. 3 shows another preferred embodiment of the invention in which several independent cells are provided and operated along an aisle 61 and/or 62. Therefore, it is possible to achieve even a much higher data rate, which is required, for example, with transportation means having a great many data stations, in particular in airplanes having a very large number of seats.

In the example shown here, the seats 3a, 3b, 3c, 3d are assigned to a first cell Z1 and additional seats 14a, 14b, 14c, 14d are assigned to a second cell Z2. Crosstalk, for example, is prevented by the fact that the surfaces reflecting the optical signals of each individual cell Z1, Z2 are adequately separated, so that the field-of-view areas of the seats 14a-14d do not see the areas of the cell Z1 that are reflecting and vice versa.

A different approach is to shape the lenses of the distributors in such a way that there is a definite separation of the surfaces reflecting signals, as explained in greater detail below.

FIG. 4a shows the interior, i.e., the cabin of a passenger airplane. A data station 5a, 7a and 17a is provided at each row of seats or seats 3a, 14a, 15a. A number of distributors 11, 12, 19 are mounted on the ceiling panel or wall panel, emitting signals across the axis of fuselage and/or across the longitudinal direction of the cabin with a beam angle 11a, 12a, 19a. Thus a number of separate cells are formed, specifically three in this example.

The data stations 5a with its field of view and/or reception beam angle 9a is assigned precisely to the distributor 11. The data station 7a with its field of view 10a is assigned to the distributor 12 and the data station 17a with its field of view 18a is assigned to the distributor 19. The distributors 11, 12 and 19 with their beam angles 11a, 12a, 19a form different independent cells Z1, Z2, Z3. In this way, the beam shaping of the optical medium which can be shaped in a very defined manner allows clear-cut separation of the shared surfaces and thus crosstalk-free creation of separate communication cells.

Figure 4B:
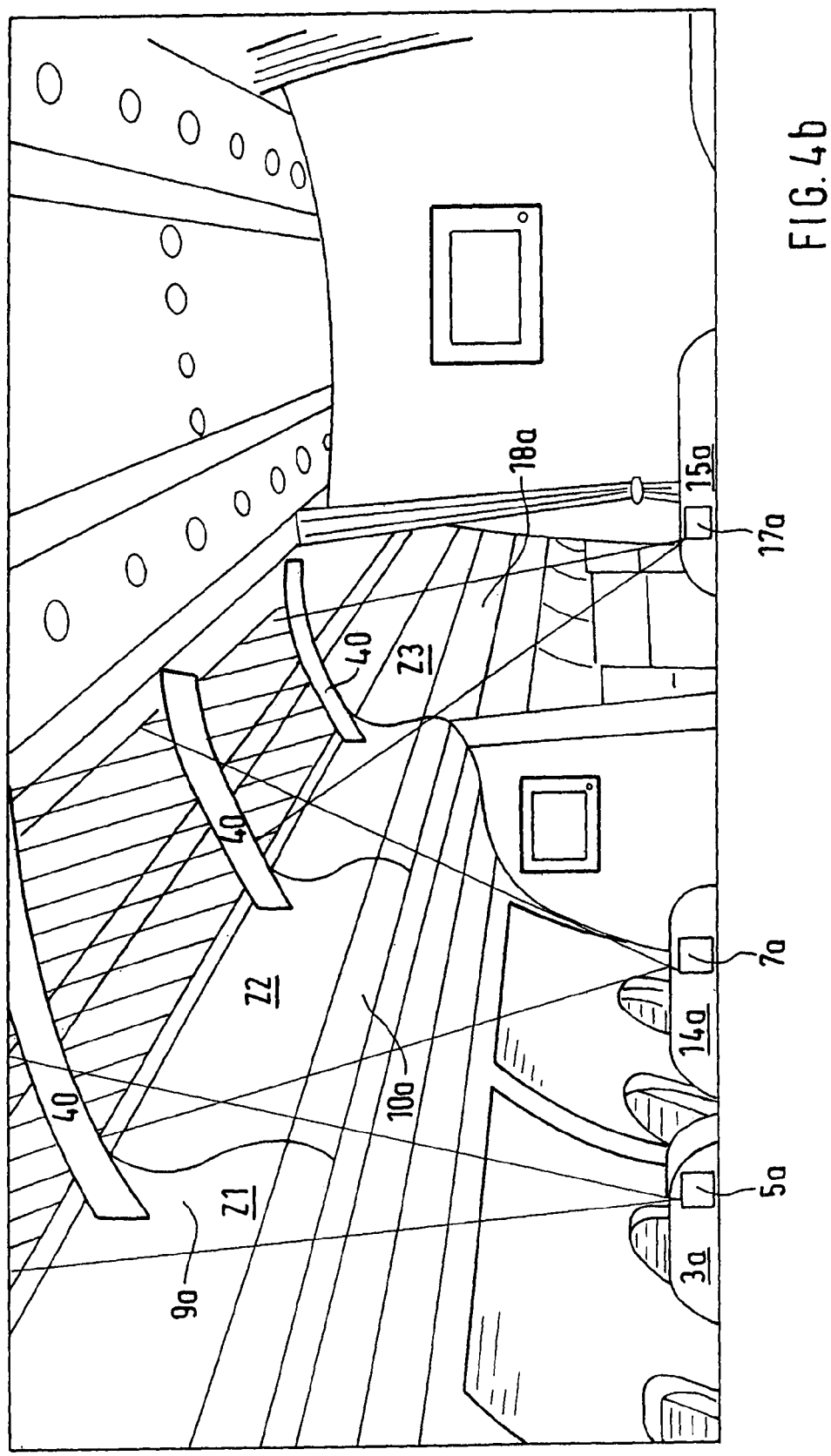
FIG. 4b shows an inventive arrangement according to FIG. 3 wherein the crosstalk is prevented by suitable beam apertures or shading elements.

FIG. 4b shows another embodiment of the invention in which shading elements 40 are mounted on the ceiling panels of the cabin limiting the beam propagation. This results in shaded areas that restrict the field of view 9a, 10a, 18a of the respective data station 5a, 7a, 17a so that here again separate cells Z1, Z2 and Z3 are formed. Beam propagation of the individual distributors is limited in particular by the shading elements 40 so that each distributor emits signals at a respective surface element that is shaded with respect to the incident light from other distributors. The data stations 5a, 7a and 17a provided at the seats 3a, 14a and 15a belong to independent communication cells Z1, Z2 and Z3 that are separate from one another, each having different distributors and/or transmitters that are separate from one another and different surface elements that reflect and/or scatter the light and are separated from one another by the shading elements 40. The fields of view 9a, 10a and 18a are each directed exactly at such a surface element.

FIG. 5a shows an especially advantageous embodiment of the invention in which multiple crosstalk-free cells Z1, Z2, Z3, Z4 are operated along the aisle 61 of the airplane, using two different transmission wavelengths L1 and L2. In this example, the beams and the fields of view of the respective cells are not specially shaped or limited, but instead they may even overlap optically. The individual cells Z1, Z2, Z3, Z4 are designed so that the wavelengths used alternate along the rows of cells. In this example, the cell Z1 is operated at the wavelength L1 while the cell Z2 adjacent thereto is operated at the wavelength L2 which is different from the wavelength L1. In the next cell Z3 but one, which is adjacent to the cell Z2, again the first wavelength L1 is used because this then generally originates from the area of the field of view 90 of the data stations of the first cell Z1. In this way, almost any alignment of independent communication cells can be implemented with only two different wavelengths that are used in alternation. In the present example, seats 3a-d are assigned to the first cell Z1, seats 14a-14d are assigned to the second cell Z2, seats 15a-15d are assigned to the third cell Z3 and seats 27a-27d are assigned to the fourth cell Z4. All the cells are situated along the aisle 61. The second aisle 62 may be designed like the first aisle 61, i.e., having cells Z1 through Z4.

A particular example follows.

In an airplane comprised of two aisles and three rows of seats, the outer rows of seats each having two seats and the inner row of seats having four seats, so that the airplane has a total of 336 seats arranged in such a way, for example, the ceiling panels of the two aisles are used as the shared surface for reflection/as the field of vision. All three rows of seats are alternated between the two wavelengths. The data stations of the middle row of seats are aligned so that each is directed at the more proximate aisle panels.

In this way, 12 seats are always assigned to one communication cell. Independent communication cells are formed along each aisle by the alternation of the wavelength 14 used, yielding a total of 28 cells.

If each cell has a data rate of 100 Mbit/s, for example, then in the entire airplane a data rate of 2.8 Gbit/s can be transmitted independently for each. A rate of 8 Mbit/s can be assigned to each individual seat. However, each of the 12 seats of a 100 Mbit/s cell can also be wired in such a way that it is able to utilize the full data rate of 100 Mbit/s as needed if the other seats are not transmitting any data and/or the data rate is shared differently.

Figure 5B:
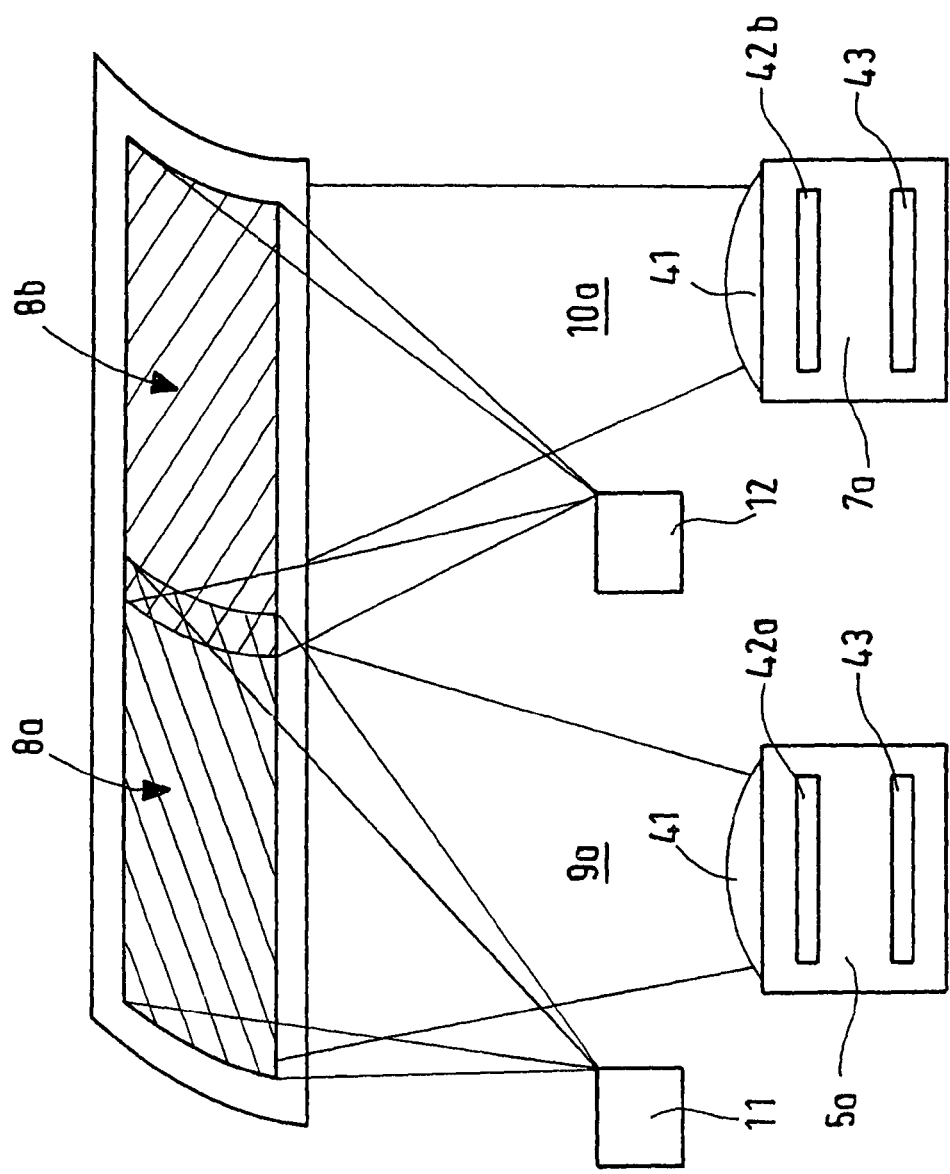
FIG. 5b shows a schematic design of two neighboring cells of different transmission wavelengths.

FIG. 5b shows a detailed view of the arrangement described here with overlapping cells. The distributor 11, which is a transmitter or a transceiver, emits signals at the surface 8a with light sources in the form of LEDs of the wavelength L1. The surface 8a is seen by the receiver of the data station 5a through its field of view 9a. The light reflected by the surface 8a passes through a lens 41 that defines the field of view 9a and strikes a photodetector 43, whereby a filter 42a is installed between the lens 41 and the photodetector 43. The filter 42a allows light of wavelength L1 to be transmitted and blocks light of wavelength L2. This filter may of course also be mounted on the lens 41 or on the photodetector 43, e.g., in the form of dielectric layers and/or through a suitable choice of materials or the color of lens 41.

Another distributor 12 directs signals at the surface 8b which overlaps with the surface 8a, whereby light sources of the wavelength L2 are used. The overlap is not obligatory but instead there may also be a separation between the surfaces reflecting signals 8a and 8b. The data station 7a assigned to the distributor 12 is designed like the data station 5a, but the filter 42b blocks the light of the wavelength L1 while it allows the light of wavelength L2 emitted by the distributor 12 to be transmitted.

Figure 6:
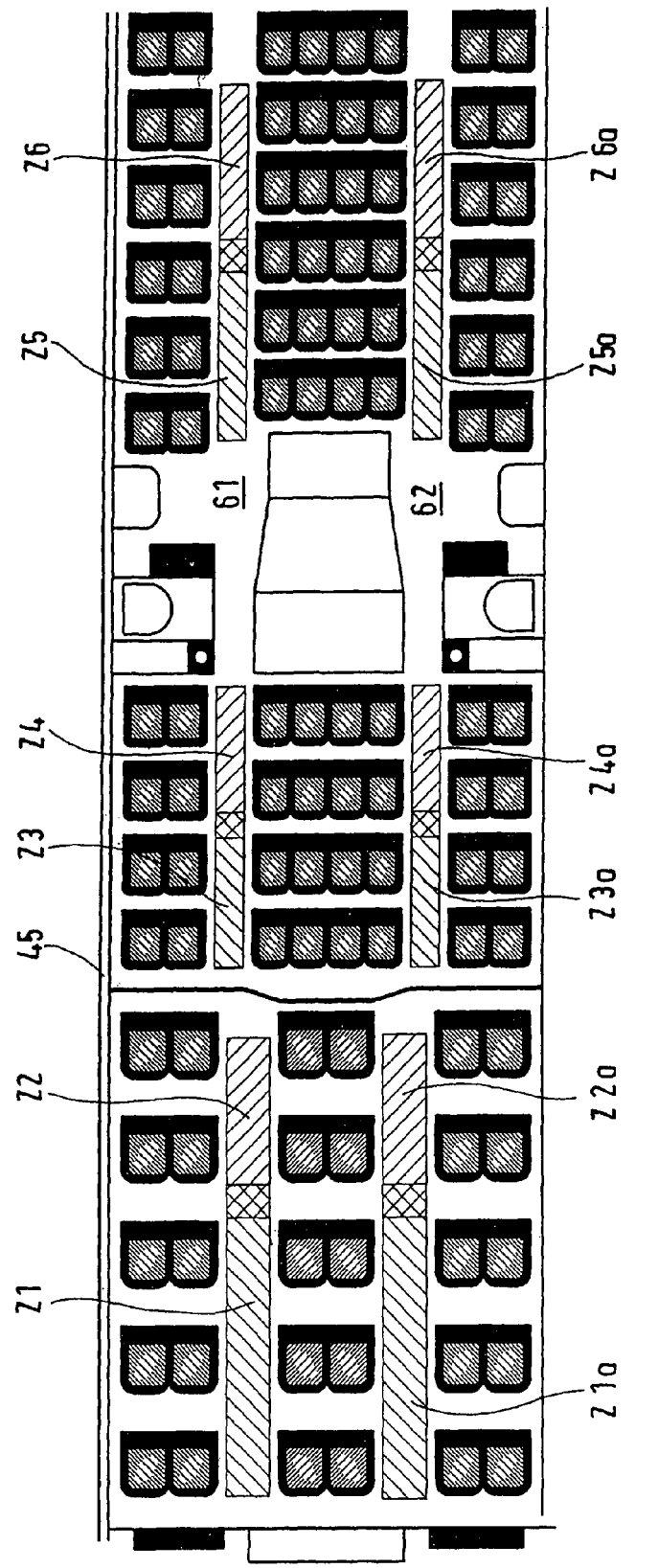
FIG. 6 shows a preferred embodiment of the invention through a combination of the aforementioned methods.

FIG. 6 shows a combination of the various features of the inventive communication system according to yet another preferred embodiment. This combination has a great many independent cells and thus an extremely enhanced data rate in comparison with the use of only a single cell. The cells Z1 and Z1a in the neighboring aisles 61 and 62 may have the same wavelength, but there is no crosstalk between them because the baggage compartments 30 in the middle (see FIG. 2) of the airplane optically shade the shared surfaces of the two cells Z1, Z1a from one another, and the respective receivers cannot see the shared surfaces of the other cells.

Along the aisle 61 there is another cell Z2 which is adjacent to the cell Z1, whereby the optionally overlapping optical regions of the cells Z1 and Z2 are separated to prevent crosstalk by using a second wavelength. By analogy with that, the two cells Z1 and Z2 are arranged in the neighboring aisle 62.

The two next cells Z3 and Z4 in the aisle 61 are shaded with respect to one another and with respect to the cells Z1 and Z2 by a shading element 45 such that there cannot be any crosstalk here. The shading element 45 is, for example, a class divider in the passenger cabin, i.e., a curtain. Likewise there is no crosstalk between cells Z1 and Z2 due to this shading element 45 on the one hand but also due to the separation of cells Z1 and Z2. Similarly, the cells Z3a and Z4a which are also protected from crosstalk with respect to cells Z1a and Z2a by the shading element 45 are arranged in aisle 62. The two neighboring cells Z3 and Z4 and/or Z3a and Z4a have different wavelengths L1 and L2.

The next cells Z5 and Z6 in the aisle 61 and/or cells Z5a and Z6a in aisle 62 are separated from cells Z4 and Z4a by a great spatial separation, i.e., the shared surfaces of the cells are each outside of the field of view of the receivers of the other cell so that no crosstalk takes place here either. The neighboring cells Z5 and Z6 and/or Z5a and Z6a in turn differ in their wavelengths L1 and L2.

Accordingly, the entire fuselage of the airplane can be equipped with independent crosstalk-free cells through a suitable combination or selection of the inventive measures such that a very broadband data network can be implemented with a multiple of the nominal bandwidth of an individual cell. Through the inventive measures, the advantageous properties of the optical transmission medium are utilized in particular—in the field of wireless transmission, such multiple occupancy of the same transmission band is impossible because of the completely different propagation behavior here.

The proposed data transmission system is therefore suitable for transmission of very high data rates, so that it causes a low EMF and nevertheless has a very high flexibility. A direct line-of-sight connection between the transmitter and receiver is not necessary so there is a very high flexibility with respect to their spatial arrangement.

The transmission and reception modules may be integrated directly into data stations such as displays, miniature computers, etc. The number of transmission and reception elements is not limited by cables, plugs or the like and can be kept flexible.

In addition, increased security against interception is ensured, thus offering an advantage over traditional wireless approaches. Due to the low possibility of penetration of optical radiation with respect to most materials, modulated light radiation cannot penetrate out of the transportation means. In the case of windows, no radiation can be detected at a distance of a few meters away from the transportation means owing to the high divergence and relatively low intensity of the scattered radiation. To further suppress even this residual radiation, the window surfaces may also be coated in such a way that the wavelength of the transmitter radiation, which is usually in the near-infrared, cannot be transmitted through the window without restricting the transmission of the windows in the visible range. Certain coatings, in particular dielectric layers may be provided for this purpose, for example.

In summary, the present invention relates to an optical free-space data communication system for broadband transmission of high-speed data, e.g., video data comprising at least one transmitter and at least one receiver, whereby the data transmission within a transportation means, e.g., a motor vehicle, plane, train, boat, satellite and the transmitter has at least one light source, e.g., LED, VCSEL or the like which is modulated at the frequency of the data to be transmitted and optionally encoded, and the receiver contains at least one photodetector that receives the light scattered and/or reflected on the walls in the interior of the transportation means without requiring a direct line-of-sight connection between the transmitter and receiver, and this modulated light signal is converted back into an electric signal.

The invention provides the following advantages.

No cabling is necessary so the weight is reduced. Plugs, cable distributors or the like are emitted. Therefore increased flexibility is achieved. The damping is low. A transmission of high data rates is possible with this system, but there is only little or no EMF. Furthermore, no line-of-sight connection is required, which is why the system can be placed flexibly. Integration into displays or the like is possible. Furthermore, increased security against interception is provided.

The invention claimed is:

1. An indirect optical free-space communication system for broadband transmission of high-speed data by way of multiple independent cells within an interior of a transportation device, comprising:
a transmitter that has a modulable light source, and
a receiver that has a photodetector to receive light emitted by the transmitter without requiring a direct line-of-sight connection between the transmitter and the receiver and without requiring cabling, said light being converted into an electric signal,
wherein the transmitter and the receiver are directed at at least one shared surface, which reflects the light emitted by the transmitter before it reaches the receiver,
wherein said transmitter is one of a plurality of transmitters and said receiver is one of a plurality of receivers,
wherein the free-space communication system is designed as a cellular system having the multiple independent cells arranged in rows within the transportation device, each of the multiple independent cells comprising one of said transmitters and at least one respective receiver, and
wherein adjacent cells of the multiple independent cells are designed to utilize different wavelengths so as to prevent crosstalk with a neighboring cell so that the cells are independent of one another.

2. The indirect optical free-space communication system as claimed in claim 1, further comprising at least one of means for beam shaping of a respective transmitter and means for limiting a reception beam angle of a respective receiver to prevent crosstalk.

3. The indirect optical free-space communication system as claimed in claim 1, further comprising at least one shading element for shading the light reflected by the shared surface of a cell with respect to a receiver belonging to another cell.

4. The indirect optical free-space communication system as claimed in claim 1, wherein light sources of neighboring cells have said different wavelengths.

5. The indirect optical free-space communication system as claimed in claim 1, wherein the at least one shared surface defines reflecting surfaces of the cells arranged in the interior of the transportation device in which the data transmission takes place.

6. The indirect optical free-space communication system as claimed in claim 5, wherein the transportation device is a motor vehicle, airplane, ship or satellite.

7. The indirect optical free-space communication system as claimed in claim 1, wherein reflection or scattering areas of the at least one shared surface does or do not overlap mutually within neighboring cells.

8. The indirect optical free-space communication system as claimed in claim 1, wherein the wavelengths of the light alternate in neighboring cells.

9. The indirect optical free-space communication system as claimed in claim 1, wherein the cells are spatially separated from one another.

10. The indirect optical free-space communication system as claimed in claim 1, wherein the surface of at least one of the cells is a surface of a wall or an object in the interior of a space in which data is transmitted.

11. The indirect optical free-space communication system as claimed in claim 1, wherein the light source comprises at least one LED, laser diode, edge-emitting laser diode, or VCSEL laser.

12. The indirect optical free-space communication system as claimed in claim 1, wherein the receiver comprises a light source and the transmitter comprises a photodetector to perform bidirectional communication.

13. The indirect optical free-space communication system as claimed in claim 1, wherein, during operation, a single transmitter of a cell supplies the data simultaneously to a plurality of receivers.

14. The indirect optical free-space communication system as claimed in claim 1, wherein the light emitted by the transmitter of a cell is limited in its beam angle such that it does not reach the receivers of other cells.

15. The indirect optical free-space communication system as claimed in claim 1, wherein a reception beam angle of a respective receiver of a cell is limited so that the light of the cells adjacent to the light sources does not reach the receiver.

* * * * *